United States Patent [19]

Hasegawa et al.

[11] Patent Number: 5,238,520

[45] Date of Patent: Aug. 24, 1993

[54] FILAMENT WINDING APPARATUS

[75] Inventors: Katsumi Hasegawa; Yoshihiko Osawa; Ichiro Kumo, all of Shiga, Japan

[73] Assignee: Toray Industries, Inc., Tokyo, Japan

[21] Appl. No.: 888,863

[22] Filed: May 27, 1992

[51] Int. Cl.$^5$ .................... B65H 54/22; B65H 81/00

[52] U.S. Cl. .................... 156/425; 156/171; 156/169; 156/429; 156/430; 156/458; 156/446; 242/35.5 R; 242/35.5 A

[58] Field of Search ............ 156/425, 171, 172, 173, 156/429, 430, 458, 446, 169, 448; 242/35.5 R, 35.5 A

[56] References Cited

U.S. PATENT DOCUMENTS

| | | | |
|---|---|---|---|
| 3,470,052 | 9/1969 | Herman | 156/450 X |
| 3,607,566 | 9/1971 | Medney | 156/448 X |
| 3,730,795 | 5/1973 | Medney | 156/169 |
| 4,062,717 | 12/1977 | McClean | 156/458 X |
| 4,325,766 | 4/1982 | Michael | 156/425 X |
| 4,671,842 | 6/1987 | Prochaska et al. | |
| 4,692,196 | 9/1987 | Ellegood et al. | 156/425 X |
| 4,710,255 | 12/1987 | Takeuchi et al. | 156/425 X |

FOREIGN PATENT DOCUMENTS

| | | | |
|---|---|---|---|
| 2423914 | 12/1975 | Fed. Rep. of Germany | 156/425 |
| 2313194 | 12/1976 | France | 156/446 |
| 61-68234 | 4/1986 | Japan | |
| 61-79631 | 4/1986 | Japan | |
| 61-79632 | 4/1986 | Japan | |
| 61-79633 | 4/1986 | Japan | |
| 61-79634 | 4/1986 | Japan | |

*Primary Examiner*—Jeff H. Aftergut
*Attorney, Agent, or Firm*—Birch, Stewart, Kolasch & Birch

[57] ABSTRACT

Disclosed is a filament winding apparatus comprising a winding mechanism having a pair of arms for winding traversed filamentary yarns impregnated with a resin onto a plurality of mandrels, respectively, and a mandrel retaining mechanism having mandrel receiving portions by a number of at least two times of the number of the mandrels to be set on the arms of the winding mechanism. The arms are swung between a winding position and a mandrel exchange position of the mandrel retaining mechanism. The retaining mechanism is a little moved when the mandrels are exchanged. A plurality of mandrels can be easily and efficiently exchanged at the same time without a particular device. The number of the mandrels for simultaneous filament winding can be increased and a high productivity can be obtained. Further, this apparatus can be realized at a relatively low cost.

16 Claims, 13 Drawing Sheets

FILAMENT WINDING APPARATUS

BACKGROUND OF THE INVENTION

1. Field of Invention

The present invention relates to a filament winding apparatus for winding a plurality of filamentary yarns impregnated with a resin onto a plurality of mandrels, respectively, and more particularly to a filament winding apparatus which can exchange from a plurality of full mandrels at once or in one lot easily and efficiently into a plurality of empty mandrels.

2. Description of the Prior Art

In a conventional filament winding apparatus for producing fiber reinforced plastics (FRP), it takes much time and many hands for exchange of mandrels because of many operations to remove and set many mandrels individually from and onto the apparatus. Namely, after filamentary yarns impregnated with a resin are wound onto mandrels, firstly, by hands or by using a mandrel donning and doffing apparatus, the mandrels are detached from winding shafts of a winder and transferred to a mandrel storage stand. Then, empty mandrels prepared on another stand are transferred to the winder, and attached to the winding shafts. In the exchange of mandrels in a filament winding apparatus of which winder has multiple winding shafts, the above operation must be conducted successively one by one. Even if a mandrel donning and doffing apparatus is used, the distance between the adjacent winding shafts of the winder must be designed sufficiently large so that troubles do not occur when the parts of the mandrel donning and doffing apparatus are inserted therebetween. Therefore, the number of the winding shafts incorporated into a single winder is limited to two or three although the limited number varies depending on the shape of the products to be formed. In such a limited condition, sufficient advantage due to a multiple winding cannot be obtained.

Moreover, dollies are frequently used for the operation of conveying empty mandrels to a mandrel storage stand of a filament winding apparatus and the operation of the conveying mandrels wound with filamentary yarn, that is, full mandrels, from another stand to a next process. In these operations, in practice, the mandrels are transferred one by one between the dollies and the stands by hands or by using mandrel exchange apparatuses, and it is inefficient.

An automated system wherein a plurality of mandrels are automatically conveyed between a mandrel preparing apparatus, a filament winding apparatus, a curing furnace, a post-processing apparatus, a mandrel removing apparatus, etc., and the respective operations are performed during the conveying, is disclosed in U.S. Pat. No. 4,671,842. In this system, however, there are some problems such as ones that it is difficult to harmonize the treatment times of the respective apparatuses in the system and that the system becomes to be a large scale and requires a great cost and a quick response cannot be made.

On the other hand, the conventional filament winding apparatus itself has some problems. For example, after formation of full mandrels, in the operation of changing filamentary yarns from full mandrels to empty mandrels, each filamentary yarn connected to each of the full mandrels is cut and the cut end of the filamentary yarn is held on a part of the apparatus, and after exchanging mandrels for the full mandrels to empty mandrels, each held filamentary yarn is wound by hand onto each empty mandrel for preparing a next winding session. On this step, it takes much time and many hands for such a filamentary yarn changing operation.

Furthermore, usually a tape is wound on the outer surface of a layer formed on the mandrel comprising the filamentary yarn impregnated with resin wound thereon, for squeezing air from the layer mixed therein in form of bubbles. The tape is usually rewound from a reel attached to the filament winding apparatus. A part of or the whole of this tape winding operation is also performed by hand. Therefore, the tape end must be pulled out from the reel by hand, and after the tape is wound, the tape must be cut manually and the tape end retained on the mandrel side is fixed on the surface of the layer by an adhesive tape. On this operation, also it takes much time and many hands.

SUMMARY OF THE INVENTION

An object of the present invention is to provide a filament winding apparatus which is capable of performing easy exchange of a plurality of full mandrels for a plurality of empty mandrels at once or in one lot, a high productivity, easy use and quick response, and which is obtainable in a relatively low cost.

Another object of the present invention is to provide a filament winding apparatus which can easily convey mandrels which have been wound with filamentary yarns and empty mandrels which are to be newly wound with filamentary yarns.

A further object of the present invention is to provide a filament winding apparatus which can automatically change a plurality of filamentary yarns from mandrels which have been wound with the filamentary yarns to empty mandrels in a short period of time.

A still further object of the present invention is to provide a filament winding apparatus which can automatically wind a tape on the outer surface of the layer of filamentary yarn formed on each of full mandrels in a short period of time.

To accomplish these objects and other objects, a filament winding apparatus according to the present invention comprises in combination:

(a) yarn traversing means for traversing a plurality of filamentary yarns impregnated with a resin;

(b) yarn winding means for winding the plurality of traversing filamentary yarns onto a plurality of mandrels, respectively, which means comprises a pair of arms provided with a plurality of pairs of yarn winding units with a predetermined arrangement pitch for releasably securing the plurality of mandrels thereon and for rotating the plurality of mandrels secured thereon and an arm moving means for moving the pair of arms between a filament winding position and a mandrel exchanging position;

(c) mandrel retaining means for retaining mandrels on which full mandrels and empty mandrels are supported in parallel one after the other so that an arrangement pitch of supporting position of the full mandrels and an arrangement pitch of supporting position of the empty mandrels are equal to the arrangement pitch of the pairs of yarn winding units provided on the pair of arms respectively; and (d) position changing means for changing a relative position between the pair of arms and the mandrel retaining means so that a state on which the yarn winding unit corresponds to the supporting position of the full mandrel of the mandrel retaining means is changed to a state on which the yarn winding unit corresponds to the supporting position of the empty mandrel of the mandrel retaining means.

The filament winding apparatus may further comprises a transferring means for transferring the mandrel retaining means between the working position in front of the filament winding apparatus and a stand by position.

Further, the filament winding apparatus may further comprises a transferring means for transferring the mandrel retaining means between the working position in front of the filament winding apparatus and a stand by position.

Further, the filament winding apparatus may further comprises yarn changing means for changing the plurality of filamentary yarns from the full mandrels which are held by the yarn winding units to the empty mandrels which are exchanged for the full mandrels and held by the yarn winding units after the full mandrels are detached from the yarn winding units. The yarn changing means includes: a waste yarn winding mechanism prepared near one end portion of each mandrel, for temporarily winding thereon a filamentary yarn; a yarn cutting mechanism prepared near the waste yarn winding mechanism for cutting the filamentary yarn wound on the waste yarn winding mechanism at a position between the waste yarn winding mechanism and the full mandrel; and a yarn guiding mechanism for guiding the filamentary yarn from the full mandrel to the waste yarn winding mechanism and for guiding the filamentary yarn being wound on the waste yarn winding mechanism after cutting by the yarn cutting mechanism from the waste yarn winding mechanism to an empty mandrel which has been exchanged for the full mandrel.

Furthermore, the filament winding apparatus may further comprises tape winding means for wrapping a tape on each of the full mandrels. The tape winding means includes: a reel rotatably supported and wound thereon with the tape; a feeding mechanism for feeding the tape from the reel to the full mandrel; a tape end fixing mechanism for fixing the end of the tape fed from the reel by the feeding mechanism onto the filamentary yarn wound on the mandrel; and a tape cutting mechanism for cutting the tape which has been wound by a predetermined length on the filamentary yarn wound on the mandrel.

In the filament winding apparatus according to the present invention, a plurality of filamentary yarns impregnated with a resin are traversed by the yarn traversing means and the traversed filamentary yarns are wound onto a plurality of mandrels, respectively. The mandrels are set to a plurality of yarn winding units, respectively, and rotated for winding the traversed filamentary yarns thereon. When the winding is finished, the pair of arms which have the yarn winding units are swung around the axis positioned at a lower portion of the pair of arms from the winding position toward the mandrel exchange position where the mandrel retaining means is provided. The mandrel retaining means has mandrel supporting portions by a number of at least two times of the number of the pair of winding units in the pair of arms. In this mandrel retaining means, empty mandrels are pre-stored, for example, on every other mandrel supporting portion. After the arms are swung down to the mandrel exchange position which is very close to the working position of the mandrel retaining means, the full mandrels are detached from the yarn winding units and are placed on the empty mandrel supporting portions of the mandrel retaining means. Then, mandrel retaining means or the pair of arms are moved in a direction perpendicular to the axes of the mandrels received in the mandrel retaining means. By this motion, the yarn winding units can be separated from the full mandrels and can be positioned at the empty mandrels to be newly used for filament winding. After the empty mandrels are held by the yarn winding units, the arms are swung up to the winding position, and the next filament winding session is started.

Since the arms with the yarn winding units are swung and the yarn winding units and the mandrel retaining means are relatively moved for exchange of mandrels, a plurality of mandrels can be easily exchanged at once or in one lot without hands or a conventional mandrel exchange apparatus. Moreover, as a particular device or apparatus is not required, the cost of the apparatus according to the present invention is inexpensive. Furthermore, a large number of mandrels can be exchanged at once and at a time in comparison with the conventional apparatuses, and therefore, the productivity is extremely high.

Further, if the transferring means for moving the mandrel retaining means is provided, the full mandrels can be easily conveyed to a next process and empty mandrels can be easily conveyed from another place into the mandrel exchange position. Therefore, the mandrel supporting portions can be used for retaining full mandrels or empty mandrels during filament winding operation, the productivity can be further improved and the cost for production can be further decreased.

Further, if the yarn changing means including the waste yarn winding mechanism, the yarn cutting mechanism and the yarn guiding mechanism is provided, a plurality of filamentary yarns can be automatically changed from full mandrels to empty mandrels in a short period of time, and the productivity can be further increased.

Furthermore, if the tape winding means is provided, the tape can be automatically wound on each full mandrel in a short period of time, and the productivity can be further increased.

BRIEF DESCRIPTION OF THE DRAWINGS

These and other objects and advantages of the invention will be apparent from the following description and the accompanying drawings, in which.

DETAILED DESCRIPTION OF THE PREFERRED EMBODIMENTS OF THE INVENTION

Figure 1:
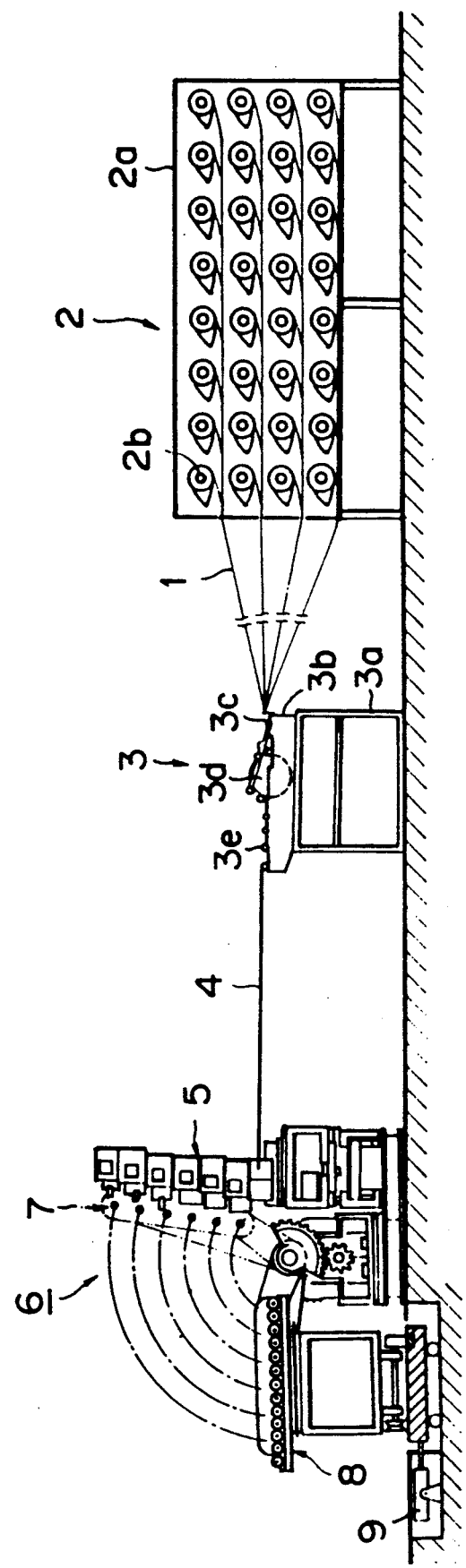
FIG. 1 is a schematic side view of one embodiment of the filament winding apparatus of the invention equipped with a yarn creel, a resin bath and a tape wrapping device.
Figure 2:
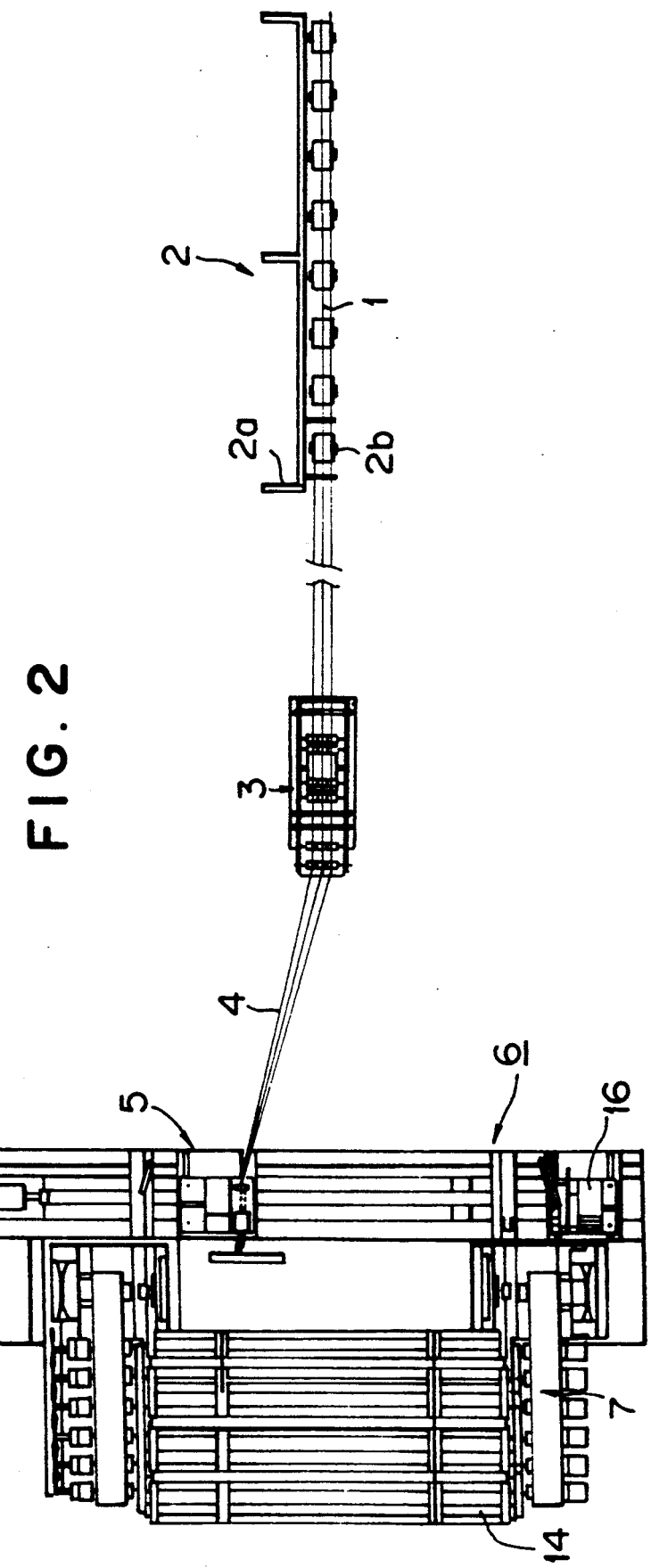
FIG. 2 is a plan view of the apparatus shown in FIG. 1.

Referring to FIGS. 1 and 2 of the drawings, an apparatus for fabricating a fiber reinforced cylindrical plastic member comprises a filament winding apparatus 6 according to the invention, a creel device 2 on which a plurality of yarn packages 2b are provided and a resin applying device 3 in which a resin to be adhered to each of yarns 1 drawn from the yarn packages 2b is stored.

Each of the yarns 1 is composed of a bundle of a plurality of filaments and acts as reinforcing material in the cylindrical plastic member. The filaments used to reinforcing plastics includes, among others, carbon filaments, glass filaments, aramide filaments, metal filaments, and the like.

The creel device 2 comprises a creel stand 2a on which a plurality of creels are arranged in a matrix. Each of the yarn packages 2b is hung on each of the creels. Each of yarns 1 drawn from each of the yarn packages 2b is fed to the resin applying device 3 under a constant yarn tension which is regulated by a tension compensator (not illustrated) provided on each of the creels of the creel stand 2a. Such a creel device is conventional in this art.

The resin applying device 3 comprises a stand 3a, a resin bath 3b mounted on the stand 3a, in which a liquid resin is stored, a guide bar 3c mounted on the resin bath 3b at the yarn entrance side thereof for arranging a plurality of yarns 1 in a horizontal plane with a predetermined pitch, a resin applying roll 3d rotatably mounted on the resin bath 3b at the middle portion thereof for impregnating the yarns 1 with the liquid resin, and a squeezing bar 3e mounted on the resin bath 3b at the exit side thereof for smoothing resin adhered to the yarns 1 and removing excessive resin adhered thereto. Such a resin applying device is conventional in this art. The resins used to impregnate the filaments include, among others, epoxy resins, phenolic resins, polyester resins, and the like. Conventional hardening agents or polymerization catalysts are employed to cure the resins if necessary.

Figure 3:
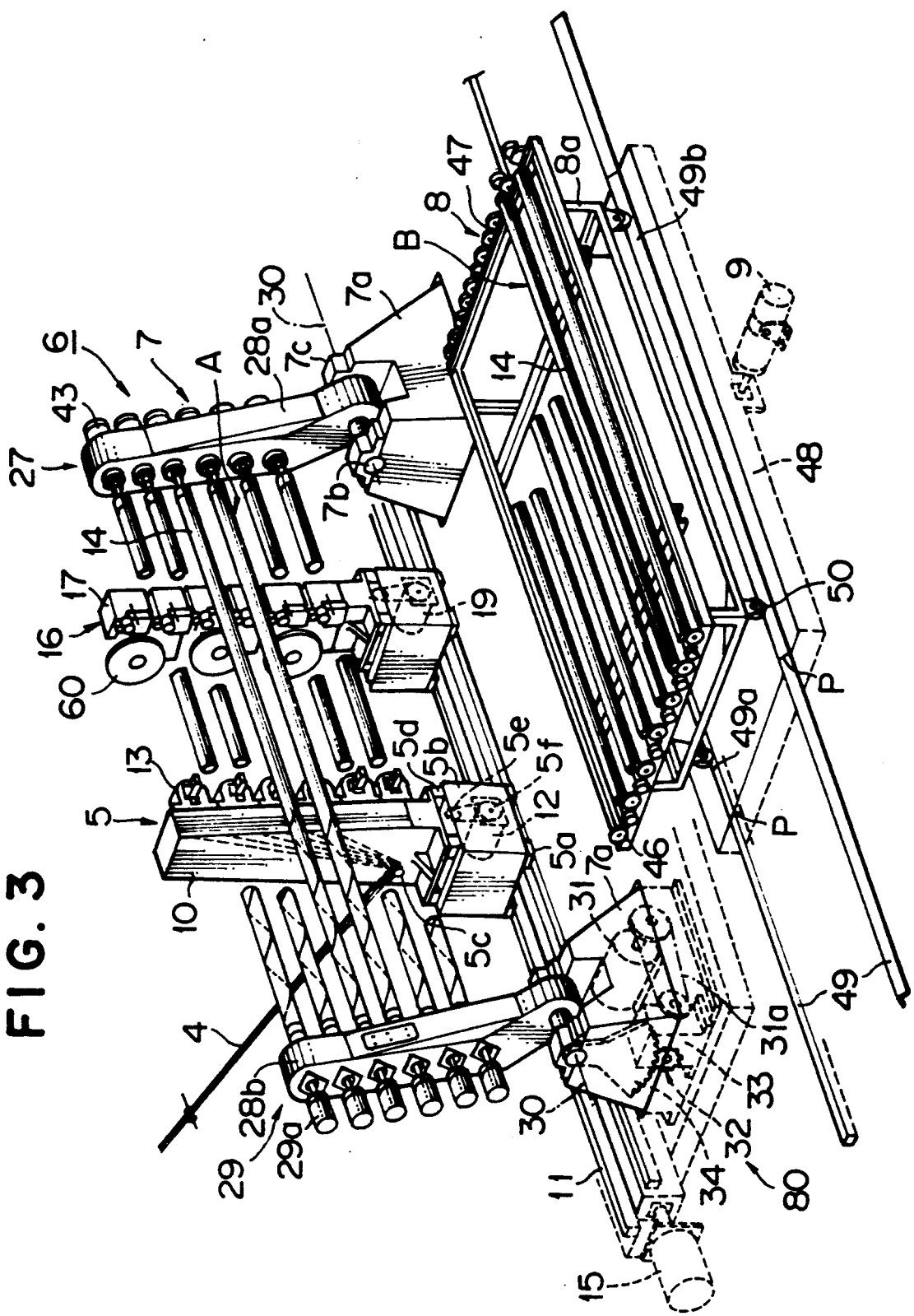
FIG. 3 is an enlarged perspective view of the main portion of the apparatus shown in FIG. 1.

Referring to FIGS. 1, 2 and 3 of the drawings, the filament winding apparatus 6 which is one embodiment of the invention comprises a yarn winding device 7, a yarn traversing device 5 and a mandrel retaining device 8.

The yarn winding device 7 comprises a pair of bases 7a, a pair of arms 28a, 28b, and a pair of mandrel supporting devices 27, 29.

Each of the bases 7a has a pair of projecting portions and a recess therebetween at the top thereof. On each of the bases 7a, a pair of bearings 7c are mounted on the projecting portions and a supporting shaft 7b is rotatably journalled in the pair of bearings 7c. Each of the arms 28a, 28b is secured on the supporting shaft 7b at the lower end portion thereof and the lower end of each of the arms 28a, 28b is received in the recess of each of the bases 7a. Inside of each of the bases 7a, a reversible motor 31 and a reduction gear train 33 are provided as shown in FIG. 3 with dotted lines. A chain wheel is secured on the output spindle of the reversible motor 31 as well as another chain wheel is mounted on the input shaft of the reduction gear train 33 and both of the chain wheels are connected with a chain 31a. A gear 32 is secured on the output shaft of the reduction gear train 33 and a sector gear 34 is secured on the supporting shaft 7b. The sector gear 34 is engaged with the gear 32.

Figure 4:
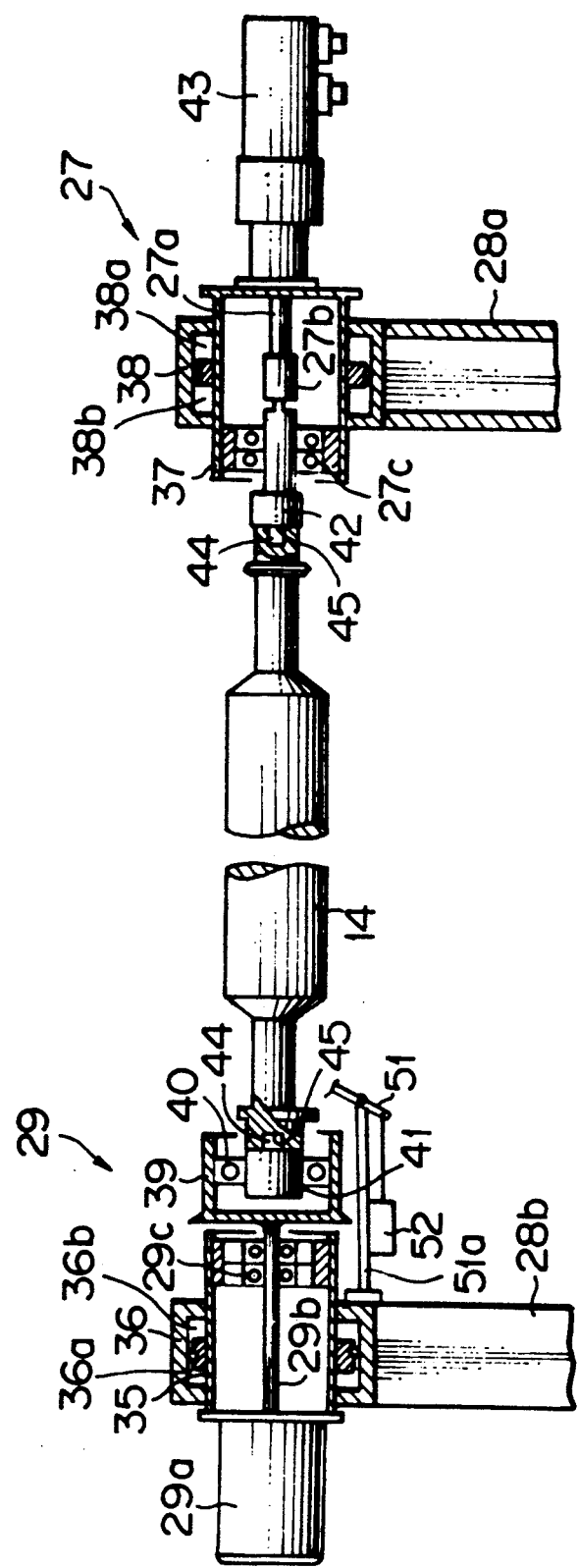
FIG. 4 is an enlarged elevational and partly cross-sectional illustration of a part of means for supporting a mandrel in the apparatus shown in FIG. 1.

The right arm 28a is provided with a group of mandrel supporting devices 27 and the left arm 28b is also provided with a group of mandrel supporting devices 29 corresponding to the group of mandrel supporting devices 27. FIG. 4 shows a pair of the right mandrel supporting device 27 and the left mandrel supporting device 29.

In FIG. 4, the right mandrel supporting device 27 comprises a right air cylinder 38, a right piston drum 37, a bearing 27c, a right mandrel chucking spindle 42, a servomotor 43, an output spindle 27a, and a coupling 27b. The right air cylinder 38 is secured in the right arm 28a. The right air cylinder 38 has a room therein and has piston drum receiving holes at both side walls thereof. A right piston drum 37 is secured slidably in the direction of the axis thereof on the piston drum receiving holes. A separating ring is fixed on the periphery of the right piston drum 37 and the room of the right air cylinder 38 is divided by the ring into the right room 38a and the left room 38b. On each of the right room 38a and the left room 38b, a hose (not illustrated) for feeding and discharging compressed air is connected. A servomotor 43 is mounted on the right side wall of the right piston drum 37. The output spindle 27a of the servomotor 43 is projected into the hollow space of the right piston drum 37 and the coupling 27b is attached on the head thereof. At the left side of the hollow space of the right piston drum 37, there is provided the bearing 27c. The outer lacer of the bearing 27c is fixed on the inner periphery of the right piston drum 37. The mandrel chucking spindle 42 is prepared and the inner lacer of the bearing 27c is fixed on the mandrel chucking spindle 42. The right end of the mandrel chucking spindle 42 is connected to the coupling 27b provided on the head of the output spindle 27a of the servomotor 43 and the left end of the mandrel chucking spindle 42 is provided with a projection 44 which will be received by a concave portion 45 prepared on one end of a mandrel 14.

On the other hand, in FIG. 4, the left mandrel supporting device 29 comprises a left air cylinder 36, a left piston drum 35, a bearing 29c, a reversible servomotor 29a, an output spindle 29b, a waste yarn winding drum 39, a bearing 40 and a left mandrel chucking spindle 41. The left air cylinder 36 is secured in the left arm 28b. The left air cylinder 36 has a room therein and has piston drum receiving holes at both side walls thereof. The left piston drum 35 is secured slidably in the direction of the axis thereof on the piston drum receiving holes. A separating ring is fixed on the periphery of the left piston drum 35 and the room of the left air cylinder 36 is divided by the ring into the left room 36a and the right room 36b. On each of the left room 36a and the right room 36b, a hose (not illustrated) for feeding and discharging compressed air is connected. The reversible servomotor 29a is mounted on the left side wall of the left piston drum 35. The output spindle 29b of the reversible servomotor 29a is projected passing through the hollow space of the left piston drum 35 and the waste yarn winding drum 39 is attached on the head thereof. At the right side of the hollow space of the left piston drum 35, there is provided the bearing 29c. The outer lacer of the bearing 29c is fixed on the inner periphery of the left piston drum 35 and the inner lacer of the bearing 29c is fixed on the output spindle 29b of the reversible servomotor 29a. The outer lacer of the bearing 40 is secured on the inner periphery of the waste yarn winding drum 39. The mandrel chucking spindle 41 is prepared and the inner lacer of the bearing 40 is fixed on the mandrel chucking spindle 41. The right end of the mandrel chucking spindle 41 is provided with a projection 44 which will be received by a concave portion 45 prepared on the other end of the mandrel 14. Though only the pair of mandrel supporting devices 27, 29 which are arranged at the uppermost positions of the pair of arms 28a, 28b are illustrated in FIG. 4, other pairs of mandrel supporting devices 27, 29 provided on the pair of arms 28a, 28b have the same structure as that of the pair shown in FIG. 4. Such a pair of mandrel supporting devices are conventional in this art.

Referring again to FIG. 3, the yarn traversing device 5 will now be explained. The yarn traversing device 5 comprises a yarn carriage stand 10, a plurality of yarn feeding units 13 arranged on the yarn carriage stand 10, a mechanism for traversing the yarn carriage stand 10 in the direction parallel to the axes of a plurality of mandrels attached on the pair of arms 28a, 28b, and a mechanism for guiding the yarn carriage stand 10 in the direction perpendicular to the axes of a plurality of mandrels. In FIG. 3, a slide base 11 is arranged on the floor along the direction parallel to the axes of the mandrels and a slide box 5b on which the yarn carriage stand 10 is arranged is slidably mounted on the slide base 11. The mechanism for traversing the yarn carriage stand 10 comprises a reversible motor 15 prepared under the floor, a screw shaft connected to the output spindle of the reversible motor 15 which extends along the slide base 11 with the length thereof and a clutch (not illustrated) provided in and fixed on the slide box 5b so that where the clutch is activated and is slidably connected with the screw shaft, and when the screw shaft is rotated in one direction by the reversible motor 15, the slide box 5b is carried on and along the slide base 11 in one traversing direction as the rotation of the screw shaft and when the screw shaft is rotated in the other direction by the reversible motor 15, the slide box 5b is carried on and along the slide base 11 in the other traversing direction as the rotation of the screw shaft. Such a traversing mechanism is conventional in this art. In FIG. 3, the mechanism for guiding the yarn carriage stand 10 back and forth comprises a slide base 5d provided on the upper surface of the slide box 5b on which the carriage stand 10 is slidably secured, a reversible motor 12 provided in and fixed on the slide box 5b, a gear secured on the output spindle of the motor 12, a screw shaft (not illustrated) rotatably supported on and provided in the slide box 5b, a gear 5e secured on the screw shaft, and a chain 5f engaged with the gear secured on the output spindle of the reversible motor 12 and the gear 5e secured on the screw shaft, and further a sliding shoe (not shown) fixed on the bottom of the yarn carriage stand 10 and slidably secured on the screw shaft arranged in the slide box 5b. Such a yarn guiding mechanism is conventional in this art.

Figure 5:
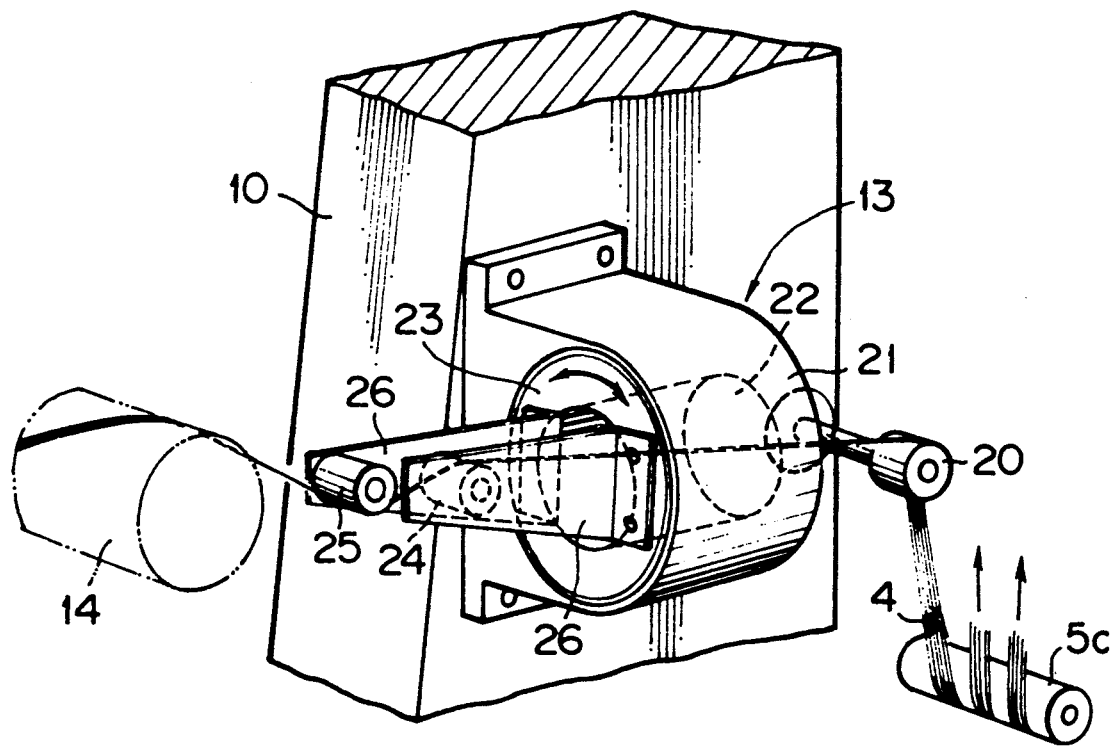
FIG. 5 is an enlarged perspective view of a part of a yarn carriage in the apparatus shown in FIG. 1.

As illustrated in FIG. 3, the yarn carriage stand 10 has the plurality of yarn feeding units 13 and a yarn gathering roller 5c. One of each yarn feeding unit 13 is enlarged and shown in FIG. 5. The yarn feeding unit 13 comprises a bracket 21 mounted on the yarn carriage stand 10, a cylinder 23 having a bore 22 which is received in and supported swingably on the bracket 21, a pair of brackets 26 mounted on the outlet end of the cylinder 23, a pair of outlet yarn guide rollers 24, 25 rotatably fixed on the pair of brackets 26, and an inlet yarn guide roller 20 rotatably fixed on the yarn carriage stand 10, and further a swing mechanism for swinging rotatably the cylinder 23 which comprises a reversible motor (not illustrated) provided in the carriage stand 10 and a transmission mechanism (not illustrated) connected between the output spindle of the reversible motor and the cylinder 23. Such a yarn feeding unit 13 is conventional in this art.

Referring again to FIG. 3, the mandrel retaining device 8 will now be explained. The mandrel retailing device 8 comprises a movable base 48 supported slidably on the floor in the direction perpendicular to the axes of the plurality of mandrels set on the pair of arms 28a, 28b an air cylinder 9 provided beneath the floor of which power shaft is connected to the movable base 48, a pair of rails 49a, 49b mounted on the upper surface of the movable base 48, a mandrel retaining dolly 8a having four wheels running on the pair of rails 49a, 49b at the bottom thereof, and a pair of mandrel receiving means 47 arranged at both side portions of the mandrel retaining dolly 8a. The mandrel receiving means 47 comprises right discs rotatably mounted with a predetermined pitch on the right end upper portion of the mandrel retaining dolly 8a and left discs rotatably mounted with a predetermined pitch on the left end upper portion of the mandrel retaining dolly 8a. A mandrel receiving portion is formed by two discs adjacent each other in each of the rows of the discs and the pair of mandrel receiving portions are formed with the two discs in the right row and the two discs in the left row which correspond to the two discs in the right row. The pitch of the mandrel receiving portion is selected in the condition that it corresponds a half pitch of the mandrel supporting means 27, 29 arranged on the pair of arms 28a, 28b. A pair of rails 49 may be prepared on the floor so that at the predetermined position of the movable base 48, the pair of rails 49a, 49b are connected to the pair of rails 49 to be able to move the mandrel retaining dolly 8a between work stations for preparing empty mandrels thereto and removing full mandrels therefrom.

Figure 6A:
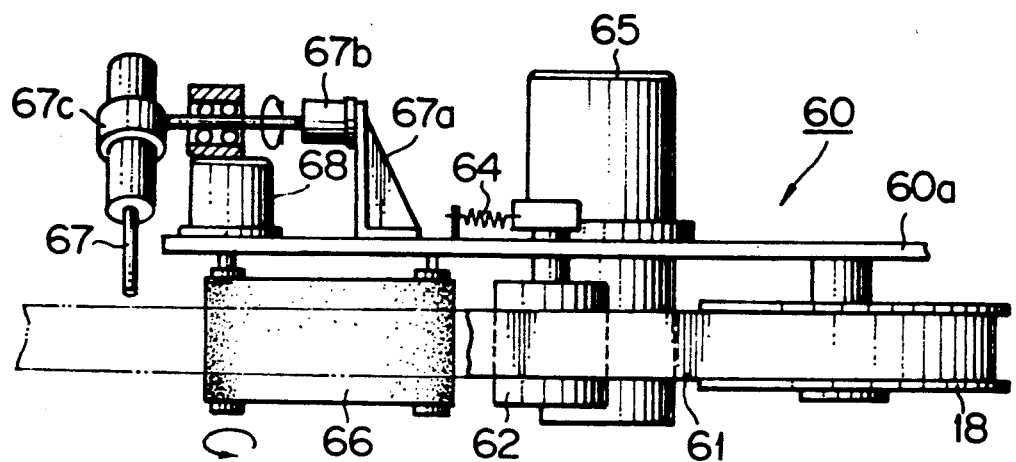
FIG. 6A is an enlarged plan view of a tape wrapping device in the apparatus shown in FIG. 1.
Figure 6B:
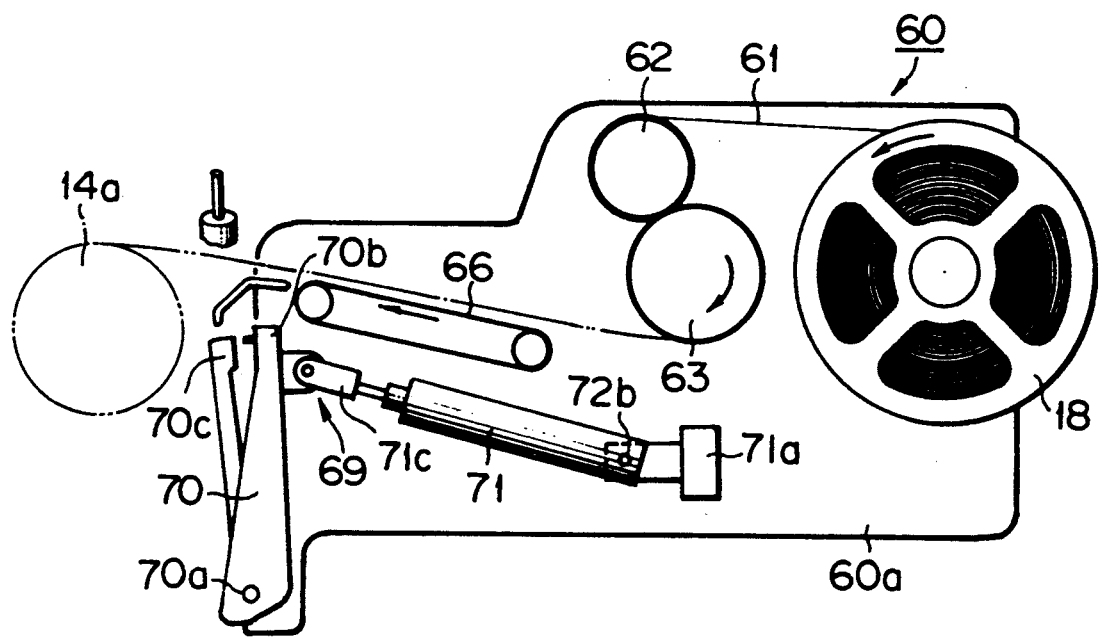
FIG. 6B is a side view of the tape wrapping device shown in FIG. 6A.

The embodiment illustrated in FIGS. 1, 2 and 3 of the drawings is provided with a tape traversing device 16. A traversing mechanism of the tape traversing device 16 for traversing thereof in the direction parallel to the axes of mandrels and a guiding mechanism for moving a tape stand 17 in the direction perpendicular to the axes of mandrels are the same as those of mechanisms in the yarn traversing device 5 explained above. On the tape stand 17, a plurality of tape feeding units 60 are arranged. The tape feeding unit 60 will be explained with FIGS. 6A and 6B of the drawings. The tape feeding unit 60 comprises a base plate 60a fixed on the tape stand 17, a tape reel 18 rotatably mounted on the base plate 60a, a torque motor 65 mounted on the base plate 60a, a roller 63 secured on the output spindle of the torque motor 65, a nip roller 62 rotatably and swingably mounted on the base plate 60a in contact with the roller 63, a tension spring 64 fixed on the base plate 60a at one end thereof and connected to the supporting shaft of the nip roller 62 at the other end thereof, a motor 68 mounted on the base plate 60a, a pair of rollers one of which is connected to the output spindle of the motor 68 and which is engaged with an endless belt 66 for feeding the tape to the full mandrel, a bracket 67a fixed on the base plate 60a, a reversible servomotor 67b mounted on the bracket 67a, a bearing journalled on the output spindle of the reversible servomotor 67b, a heater holder 67c secured on the head of the output spindle of the reversible servomotor 67b, an electrical heater 67 for cutting the tape, and a tape end fixing device 69 which comprises a bracket 71a fixed on the base plate 60a, a supporting pin 72b provided on the bracket 71a, an air cylinder 71 swingably secured on the supporting pin 72b, a supporting pin 70a on which one end portion of a stapler 70 comprising a needle stocker 70c and a needle pushing head 70b is rotatably secured, and a connecting member 71c connected to the needle pushing head 70b and the piston rod of the air cylinder 71.

Now the operation of the embodiment or the filament winding apparatus illustrated in FIG. 1 to FIG. 6B will be explained. Each yarn 1 is drawn from each yarn package 2b and fed to the resin applying device 3 in a conventional manner. Each yarn 1 is impregnated with a resin stored in the resin bath 3b by means of the resin applying roll 3d and the yarn impregnated with the resin is smoothed and squeezed by the squeezing bar 3e in a conventional manner. After leaving the resin applying device 3, each yarn 1 comes to the yarn gathering roller 5c provided on the yarn carriage stand 10 for gathering each of the yarns 1 in a group at once in a known manner. After passing through the yarn gathering roller 5c, the yarns in the group are separated into the individual yarn 1 respectively and each yarn 1 enters into each of the yarn feeding units 13 provided on the yarn carriage stand 10 in a known manner. After passing through in contact with the inlet yarn guide 20, the yarn 1 goes through the bore 22 formed in the rotatable cylinder 23 rotatably supported on the bracket 21 mounted on the yarn carriage stand 10 and is guided by the pair of outlet yarn guide rollers 24, 25 mounted on the rotatable cylinder 23 in a known manner. The yarn 1 leaving the outlet yarn guide roller 25 is wound on the mandrel 14 releasably secured on the yarn winding device 7 as the rotation of the mandrel 14 in a conventional manner. The mandrel 14 is releasably secured at both ends by the right mandrel chucking spindle 42 and the left mandrel chucking spindle 41. At the same time, the yarn receives traversing motion in the direction parallel to the axis of the mandrel 14 set between the right arm 28a and the left arm 28b. The yarn traversing motion is imparted by the traversing movement of the traversing device 5. The traversing movement of the traversing device 5 is operated by the reversible motor 15, the screw shaft fixed on the output spindle of the motor 15 and the slide base 11 in a conventional manner. The rotational movement of the mandrel 14 set on the arms 28a, 28b is performed by the servomotor 43 through the output spindle 27a of the servomotor 43, the coupling 27b secured on the output spindle 27a and the right mandrel chucking spindle 42 fixed on the coupling 27b in a known manner. The swingable rotation of the cylinder 23 of the yarn carriage 13 is provided for maintaining a constant winding angle of the yarn 1 on the mandrel 14 during one stroke of the winding operation in a conventional manner. The yarn carriage stand 10 is moved backward as the thickness of the yarn layer formed on the mandrel becomes large in a known manner. Such traversing motion may be repeated predetermined times to form a yarn layer on the mandrel. Thus, the full mandrels are produced on the arms.

Figure 7:
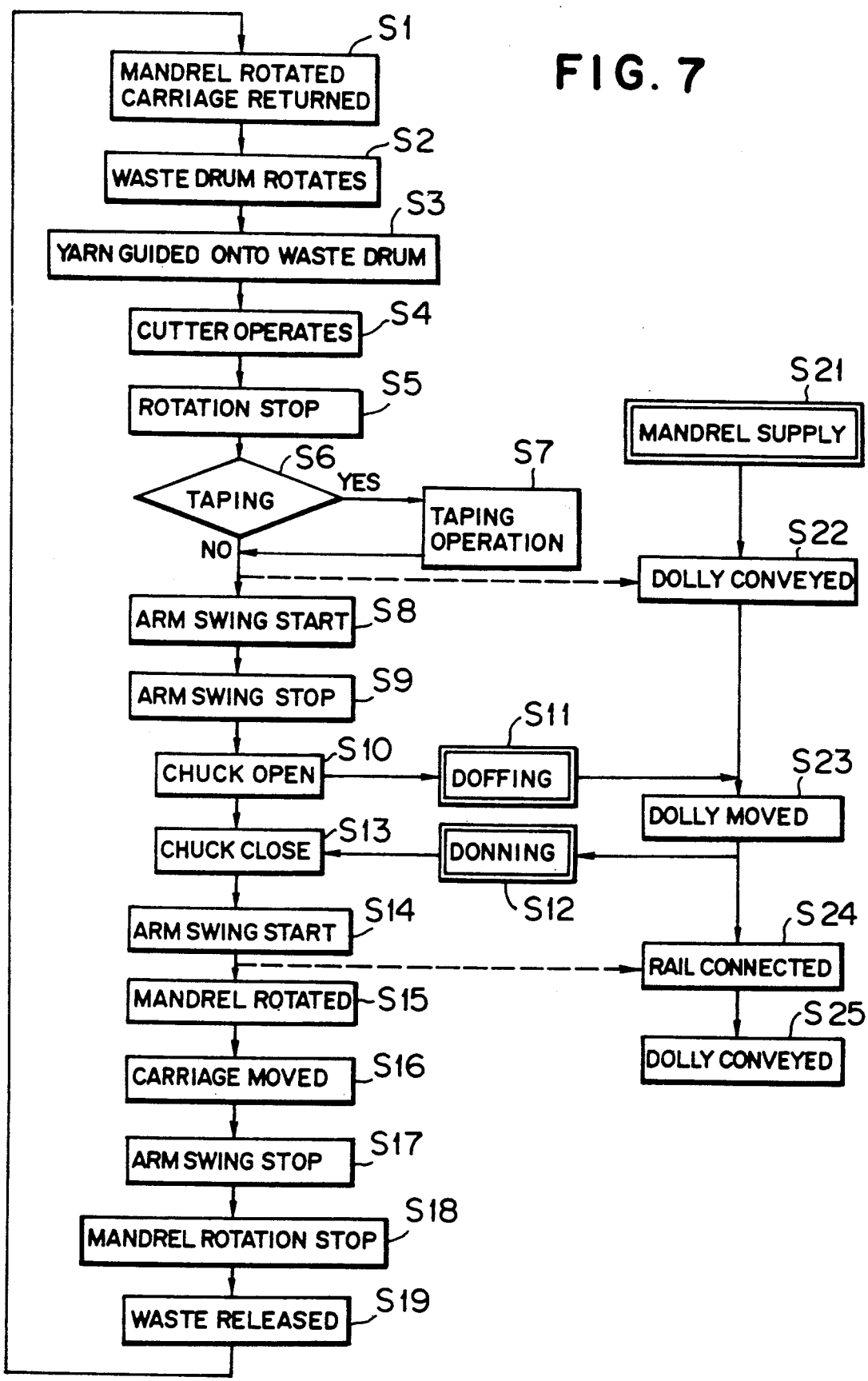
FIG. 7 is a flowchart for explaining steps of automatic exchange of the mandrels which are set On and removed from the pair of arms in the apparatus shown in FIG. 1.
Figure 8A:
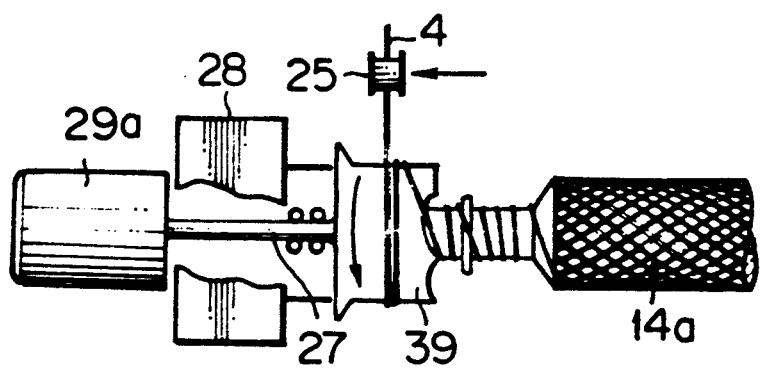
FIG. 8A to FIG. 8K are schematic views for explaining steps of changing the threading of filamentary yarns from the full mandrels to the empty mandrels in the apparatus shown in FIG. 1.
Figure 8B:
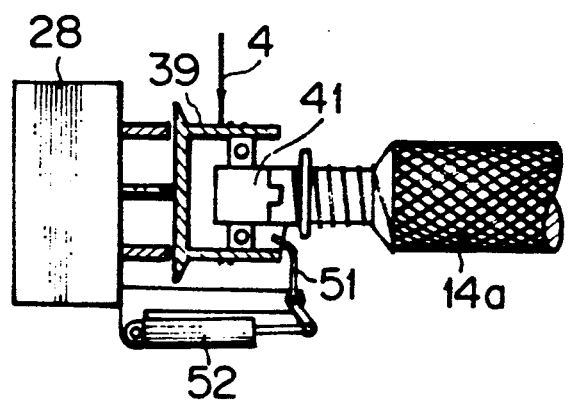
Figure 8C:
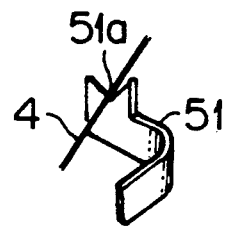

Referring to FIG. 7 of the drawings, after finishing filament winding, the yarn carriage stand 10 is moved to the position in front of the waste yarn winding drum 39 (step S1). On this position, the rotation of the waste yarn winding drum 39 is given by the reversible servomotor 29a and is started (step S2). The yarn 4 which continuously comes from the full mandrel 14 is wound on the waste yarn winding drum 39 as shown in FIG. 8A (step S3). After several windings of the yarn 4 formed on the waste yarn winding drum 39, the movement of the yarn carriage stand 10 is stopped and a yarn cutter 51 having V-shape cutting edge 51a as shown in FIG. 8C, secured on a piston rod of an air cylinder 52 is operated thereby and the yarn 4 is cut between the left end portion of the mandrel 14 and the right end of the waste yarn winding drum 39 as shown in FIG. 8B (step S4). After that, the rotations of the mandrel 14 and the waste yarn winding drum 39 are stopped respectively and the end portion of the yarn 14 is kept on the waste yarn winding drum 39 (step S5). Then, a judgement as to whether going to a step for a tape wrapping on the full mandrel or not is performed (step S6). When there is no need of the tape wrapping on the full mandrel, the doffing operation of the full mandrels from the arms 28a, 28b is started (step S8).

Figure 8D:
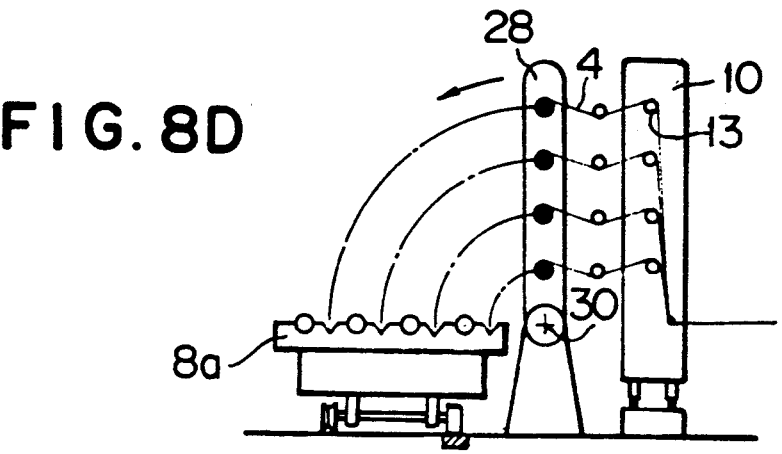

The doffing operation of the full mandrels from the arms 28a, 28b will be explained with FIGS. 8D–8F of the drawings. As illustrated in FIG. 8D, the pair of arms 28a, 28b are swung downward around the axes 30 of the supporting shafts 7b provided on the pair of bases 7a as shown in FIG. 8D with the curved arrow. During this operation, the yarn wound on the waste yarn winding drum 39 is rewound therefrom as the pair of arms 28a, 28b is swung (step S8). In FIG. 8D, the full mandrels are shown with black circles and the empty mandrels are shown with white circles.

On the other hand, the empty mandrels are set on every other mandrel receiving portions provided on the mandrel retaining device 8 in a preparing station (not shown)(step S21) and the mandrel retaining device 8 such mounted with the empty mandrels is positioned in front of the pair of arms 28a, 28b of the filament winding apparatus 6 as shown in FIGS. 3 and 8D (step S22).

Figure 8E:
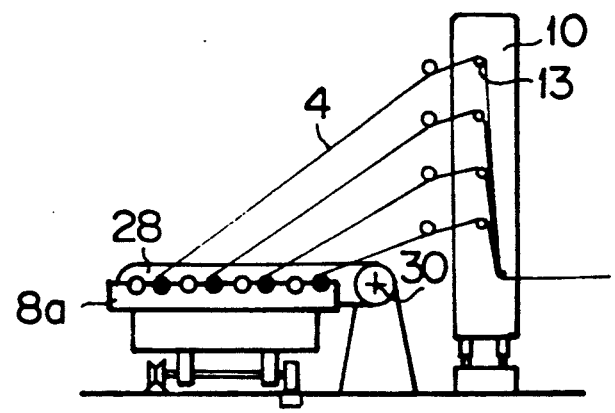
Figure 8F:
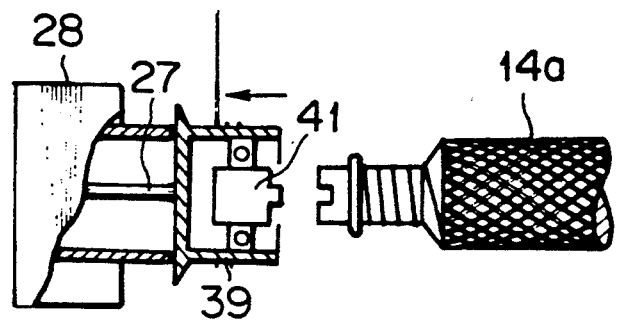

Referring to FIG. 8E, when the pair of arms 28a, 28b are swung down to the horizontal position, the swing motion is stopped (step S9). At this position, pressurized air is introduced into the left room 38b of the right air cylinder 38 and the right room 36b of the left air cylinder 36 respectively at the same time, and the right piston drum 37 slidably secured on the right arm 28a and the left piston drum 35 slidably secured on the right arm 28b are moved in the outside directions of the respective arms, respectively. By the movements of the both piston drums 37, 35, the full mandrel secured between both mandrel chucking spindles 42, 41 is released therefrom (step S10). Then, the full mandrels are received on the mandrel receiving portions for full mandrels prepared on the mandrel retaining device 8 and with this operation, the mandrel doffing operation is completed.

Figure 8G:
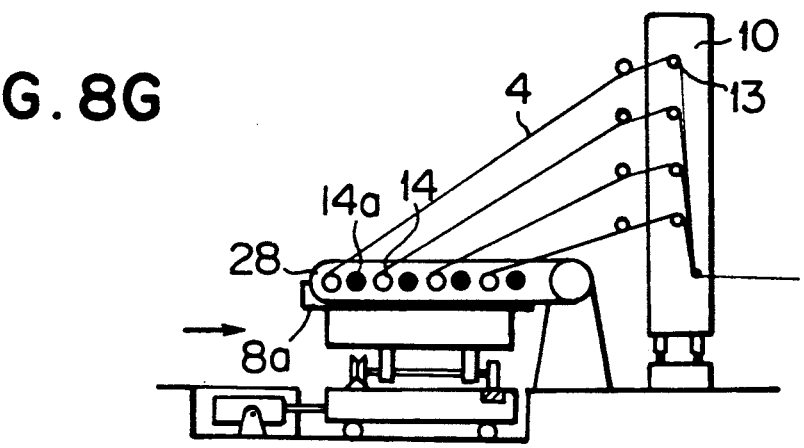

The donning operation of the empty mandrels to the arms 28a, 28b will be explained with FIGS. 8G and 8H of the drawings. As illustrated in FIG. 8G, after finishing the mandrel doffing operation, the mandrel retaining device 8 is moved in the direction perpendicular to the axes of the mandrels 14 mounted on the mandrel retaining dolly 8a by the actuation of the air cylinder 9 and the operation of the movement is stopped when the positions of the axes of the empty mandrels 14 coincide with the positions of the axes of the pair of yarn winding devices 7 provided on the arms 28a, 28b.

On that position, pressurized air is introduced into the right room 38a of the right air cylinder 38 and the left room 36a of the left air cylinder 36 respectively at the same time, and the right piston drum 37 slidably secured on the right arm 28a and the left piston drum 35 slidably secured on the left arm 28b are moved in the inside directions of the respective arms, respectively. By the movements of the both piston drums 37, 35, each empty mandrel is secured on the mandrel chucking spindles 42, 41 (step S13).

Figure 8H:
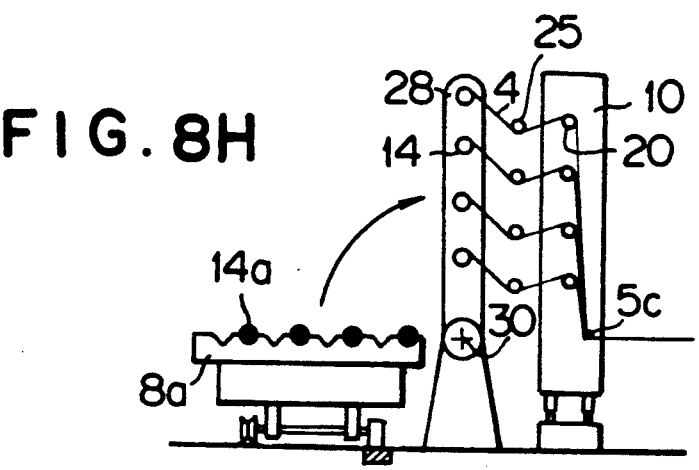
Figure 8I:
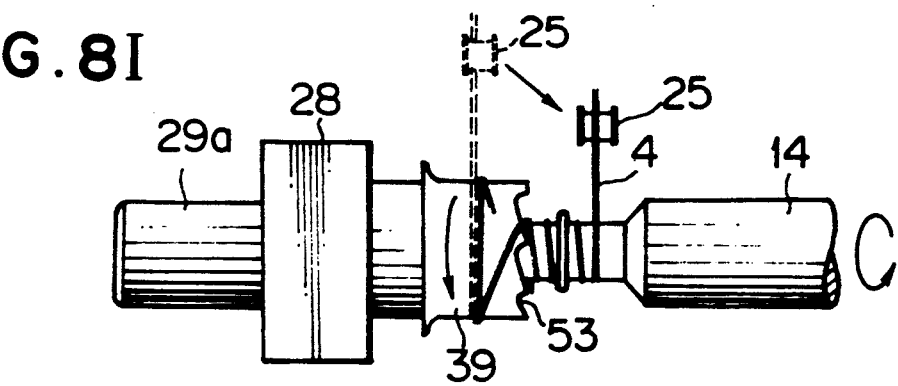

After that, the swing motions of the arms 28a, 28b are started by the reversible motor 31 and the arms 28a, 28b provided with the empty mandrels are moved to the winding position as shown with FIG. 8H (step S14). At the same time, the rotation of the empty mandrels 14 by the servomotors 43 and the rotation of the waste yarn winding drum 39 by the reversible servomotors 29a are started (step S15). And further, the movement of the yarn traversing device 5 by the reversible motor 15 to the filament winding position is started as shown in FIG. 8I (step S16). When the arms 28a, 28b are arrived at the winding position A, the movements of the arms 28a, 28b are stopped (step S17) and the rotation of the empty mandrels 14 and the rotation of the waste yarn winding drum 39 are stopped (step S18).

Figure 8J:
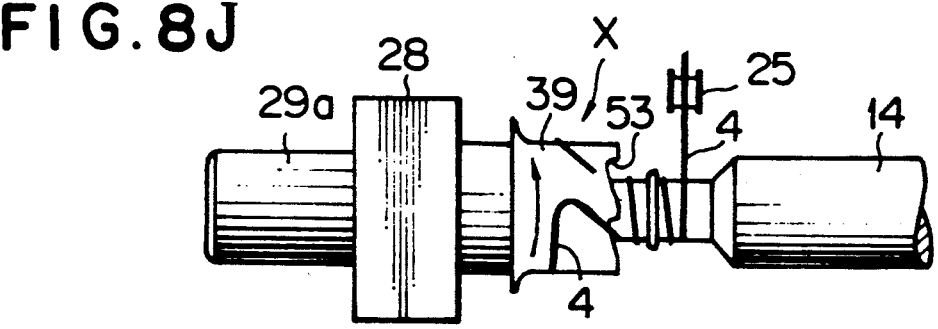

Next, the reverse rotation of the waste yarn winding drum 39 by the reversible servomotor 29a is started. The waste yarn wound on the waste yarn winding drum 39 is rewound and wound on the yarn previously wound on the end portion of the empty mandrel. The winding yarn tension for winding the waste yarn on the end portion of the empty mandrel is imparted by several concaved portions 53 provided on the end portion of the waste yarn winding drum 39 as shown in FIG. 8J. During this operation, all of the waste yarn wound on the waste yarn winding drum 39 is drawn therefrom and wound on the empty mandrel and the yarn previously wound on the end portion of the empty mandrel is fixed thereon by the winding of the waste yarn thereon. The reverse rotation of the yarn winding drum 39 is stopped. Thus, the threading of yarn 4 to the empty mandrel is completed.

Figure 8K:
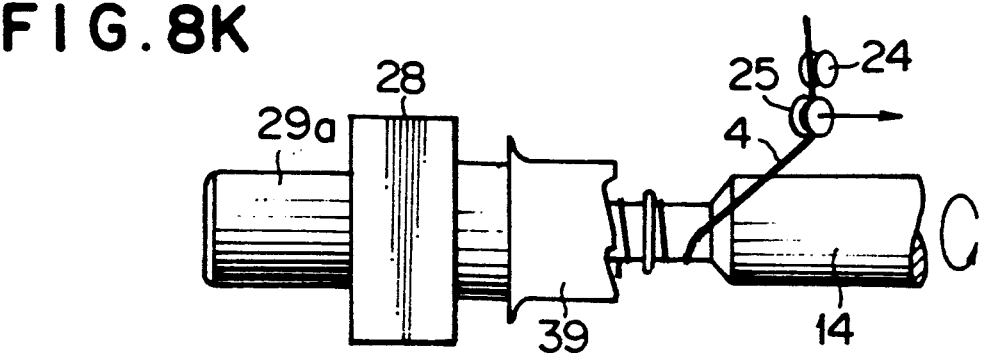
Figure 9:
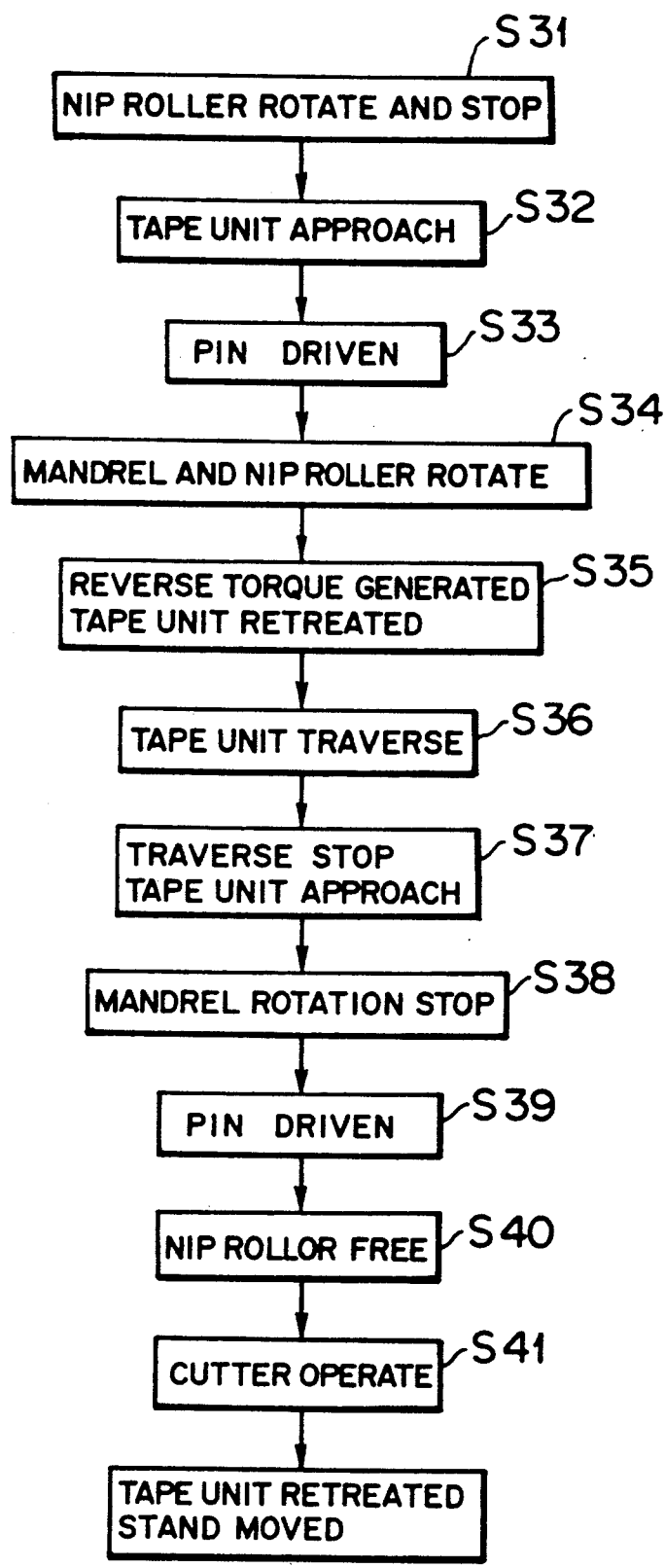
FIG. 9 is a flowchart for explaining steps of the tape wrapping to the full mandrels in the apparatus shown in FIG. 1.

After that, as shown in FIG. 8K, the regular yarn traversing is started and performed by the reversible motor 15, the servomotors 43 and the reversible motors provided in the yarn carriage stand 10 in a known manner (step S1).

On the other hand, the mandrel retaining device 8 is returned to the original position by the movement of the power shaft of the air cylinder 9 and the rails 49a, 49b thereon and the rails 49 are connected (step S24). After that, the dolly 8a mounted with the full mandrels thereon is transferred to the next working place in a conventional manner (step S25).

Figure 10A:
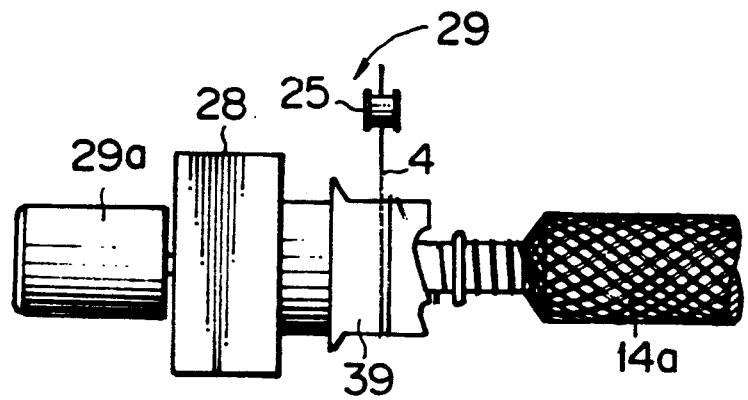
FIG. 10A to FIG. 10H are schematic views for explaining steps of tape wrapping to the full mandrels in the apparatus shown in FIG. 1.
Figure 10B:
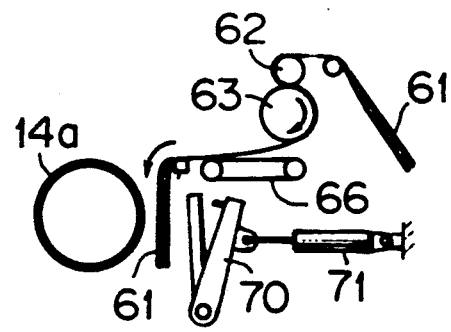

The taping operation will be explained with FIGS. 9 and 10A-10H. FIG. 10A illustrates the state of finishing the filament winding and the arms 28a, 28b are in the upright position (A). After the yarn 4 is cut by the cutter 51, the clutch provided in the slide box 5b of the yarn traversing device 5 is released from the screw shaft connected to the reversible motor 15 and the clutch provided in the slide box 5b of the tape traversing device 16 is slidably secured on the screw shaft connected to the reversible motor 15. As the rotation of the screw shaft, the tape traversing device 16 is introduced into the winding position (A) from the stand by position thereof and stopped at the left end portion of the yarn layer of the full mandrel 14a.

Figure 10C:
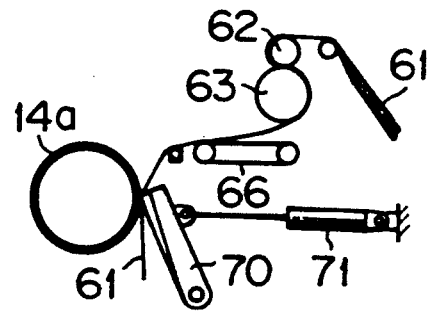
Figure 10D:
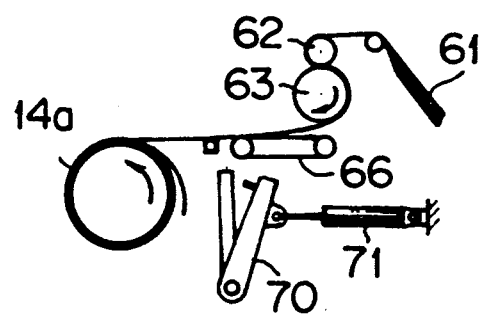
Figure 10E:
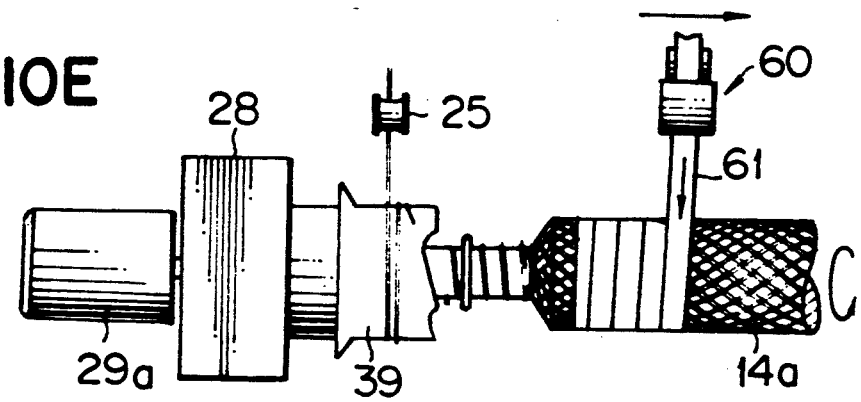
Figure 10F:
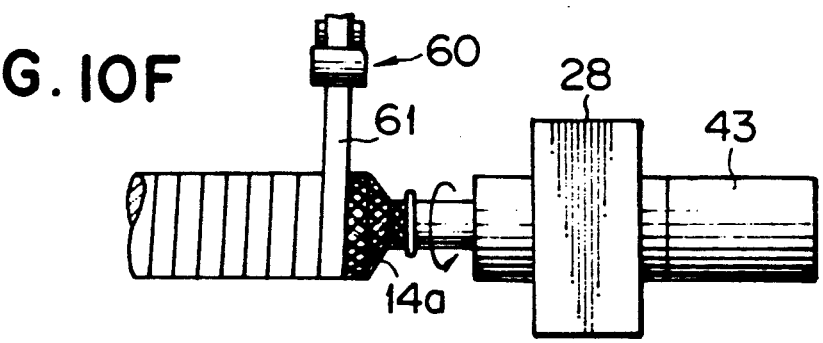

At this position, the feeding of the tape 61 by the rotation of the roller 63 which is rotated by the torque motor 65 is started and the movement of the endless belt 66 by the motor 68 is also started. The head of the tape 61 is passed through the roller 63 and conveyed by the endless belt 66 and hanged down in front of the right end portion of the yarn layer of the full mandrel. After the tape 61 is hanged down with a predetermined length, the feeding motion of the tape 61 is stopped by the stopping of the movement of the nip roller 62, 63 (step S31). After that, the tape stand 17 is moved to the mandrel 14a and stopped when the suspended portion of the tape 61 is contacted with the surface of the yarn layer of the full mandrel 14a (step S32). Then, the air cylinder 71 is actuated and the needle pushing head 70b is pushed. By the movement of the needle pushing head 70b, the needle stored in the needle stocker 70c of the stapler 70 is fed to the tape and the head of the needle is passed through the tape and driven into the yarn layer. By the driven needle, the head portion of the tape is fastened on the yarn layer of the full mandrel 14a as shown in FIG. 10C (step S33).

After returning the stapler 70 to the stand by position, the traversing movement of the tape traversing device 16 is started by the reversible motor 15 under the rotation of the full mandrel by the servomotor 43 (step S34). During the tape winding on the yarn layer of the full mandrel 14a with traversing (step S36), the winding tension of the tape 61 is kept in a suitable condition by the torque motor 65 so that air mixed into the yarn layer is effectively removed (step S35). After the tape winding being performed to the other end of the yarn layer of the full mandrel 14a as shown with FIG. 10F, the movements of the tape traversing device 16 and the rotation of the full mandrel 14a are stopped (step S37 and step S38).

Figure 10G:
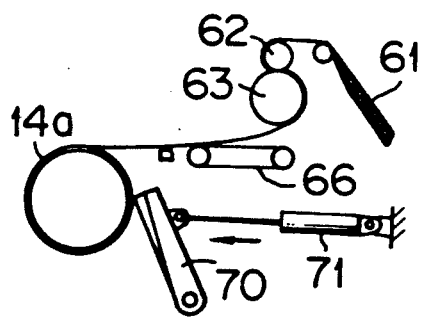
Figure 10H:
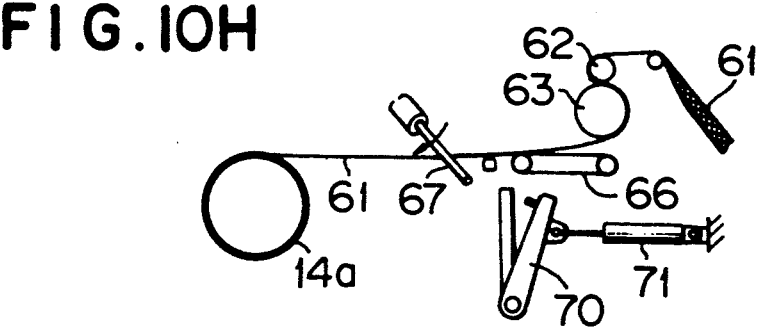

At this position, the stapler 70 is actuated again as before and the portion of the tape wound on the yarn layer positioned at the right end portion of the yarn layer is fastened with the needle provided from the stapler 70 as shown in FIG. 10G (step S39). After that, the rotation of the roller 63 is stopped (step S40). Then, the heat cutter 67 is heated and swung to the tape 61 by the reversible servomotor 67b and the tape 61 is cut by the heat cutter 67 between the full mandrel 14a and the endless belt 66 as illustrated in FIG. 10H (step S41).

Finally, the tape traversing device 16 is moved to the stand by position by the rotation of the screw shaft secured on the reversible motor 15 (step S42) and then the tape winding is finished.

Although only one preferred embodiment of the present invention has been described herein in detail, it will be appreciated by those skilled in the art that various modifications and alterations can be made to this embodiment without materially departing from the novel teachings and advantages of this invention. Accordingly, it is to be understood that all such modifications and alterations are included within the scope of the invention as defined by the following claims.

What is claimed is:

1. A filament winding apparatus comprising:
   (a) yarn traversing means for traversing a plurality of filamentary yarns impregnated with a resin;
   (b) yarn winding means for winding the plurality of traversing filamentary yarns onto a plurality of mandrels, respectively, which means comprises a pair of arms provided with a plurality of pairs of yarn winding units with a predetermined arrangement pitch for releasably securing the plurality of mandrels thereon and for rotating the plurality of mandrels secured thereon and an arm moving means for moving the pair of arms between a filament winding position and a mandrel exchanging position;
   (c) mandrel retaining means for retaining mandrels on which full mandrels and empty mandrels are supported in parallel one after the other with a predetermined arrangement pitch so that an arrangement pitch of supporting position of the full mandrels and an arrangement pitch of supporting position of the empty mandrels are equal to the arrangement pitch of the pairs of yarn winding units provided on the pair of arms respectively; and
   (d) position changing means for changing a relative position between the pair of arms and the mandrel retaining means so that a state on which the yarn winding unit corresponds to the supporting position of the full mandrel of the mandrel retaining means is changed to a state on which the yarn winding unit corresponds to the supporting position of the empty mandrel of the mandrel retaining means.

2. The filament winding apparatus according to claim 1, wherein said yarn traversing means comprises a yarn carriage stand being traversed and a plurality of yarn feeding units mounted on said yarn carriage stand and guiding said filamentary yarns to the respective mandrels held by said yarn winding units.

3. The filament winding apparatus according to claim 2, wherein each of yarn feeding units has a pair of guide rollers guiding each of said filamentary yarns to the respective mandrel, said pair of guide rollers being supported free to be swung on each yarn feeding unit.

4. The filament winding apparatus according to claim 1, wherein each of said yarn winding units has a piston drum which is mounted on said arms and is slidable in a direction of a respective mandrel axis thereof and a mandrel chucking means is rotatably secured in said piston drum.

5. The filament winding apparatus according to claim 1, wherein said mandrel retaining means has a plurality of mandrel receiving portions formed between adjacent discs of a plurality of discs arranged on said mandrel retaining means.

6. The filament winding apparatus according to claim 1, wherein said mandrel retaining means comprises a dolly.

7. The filament winding apparatus according to claim 1 further comprising means for changing said plurality of filamentary yarns from said mandrels which are held by said yarn winding units and have been wound with said filamentary yarns to empty mandrels which are exchanged for the mandrels wound with said filamentary yarns and held by said yarn winding units after the mandrels wound with said filamentary yarns are detached from said yarn winding units, the filamentary yarn changing means including:
   a waste yarn winding mechanism provided near an end of each mandrel which is held by a corresponding yarn winding unit of said yarn winding units, for temporarily winding thereon a filamentary yarn;
   a yarn cutting mechanism provided near said waste yarn winding mechanism for cutting said filamentary yarn wound on said waste yarn winding mechanism at a position between said waste yarn winding mechanism and the mandrel wound with said filamentary yarn; and
   a yarn guiding mechanism for guiding said filamentary yarn from the mandrel wound with said filamentary yarn to said waste yarn winding mechanism and for guiding said filamentary yarn being wound on said waste yarn winding mechanism after cutting by said yarn cutting mechanism from said waste yarn winding mechanism to an empty mandrel which has been exchanged for the mandrel wound with said filamentary yarn.

8. The filament winding apparatus according to claim 7, wherein said waste yarn winding mechanism comprises a waste drum on which said filamentary yarn is temporarily wound.

9. The filament winding apparatus according to claim 8, wherein said waste drum can be rotated and can be reversely rotated.

10. The filament winding apparatus according to claim 8, wherein said yarn cutting mechanism has a cutter operated by an air cylinder.

11. The filament winding apparatus according to claim 1 further comprising means for wrapping a tape on each of said mandrels which have been wound with said filamentary yarns, the tape wrapping means including:
    a reel rotatably supported and wound thereon with said tape;
    a feeding mechanism for feeding said tape from said reel to the mandrel which has been wound with said filamentary yarn;
    a tape end fixing mechanism for fixing an end of said tape fed from said reel by said feeding mechanism onto the filamentary yarn wound on the mandrel: and
    a tape cutting mechanism for cutting said tape which has been wound by a predetermined length on the filamentary yarn wound on the mandrel.

12. The filament winding apparatus according to claim 11, wherein said feeding mechanism comprises a pair of nip rollers.

13. The filament winding apparatus according to claim 12, wherein said pair of nip rollers are driven by a torque motor.

14. The filament winding apparatus according to claim 11, wherein said feeding mechanism comprises a guide belt guiding said tape toward said mandrel.

15. The filament winding apparatus according to claim 11, wherein said tape end fixing mechanism comprises a stapler and an air cylinder pushing the stapler.

16. The filament winding apparatus according to claim 11, wherein said tape cutting mechanism comprises a thermal cutter.

* * * * *